Patented May 30, 1933

1,911,830

UNITED STATES PATENT OFFICE

ROBERT B. LEBO, OF ELIZABETH, NEW JERSEY, ASSIGNOR TO STANDARD OIL DEVELOPMENT COMPANY, A CORPORATION OF DELAWARE

METHOD OF TREATING ADSORPTIVE CLAY

No Drawing.   Application filed May 31, 1930. Serial No. 458,935.

This invention relates to the treatment of clays used in the filtering of oils.

Adsorptive clay such as fuller's earth, Attapulgus clay and the like are used for removing coloring ingredients from oils. The clay on contact with the oil adsorbs the tarry coloring ingredients from the oil. The efficiency of the clay as an adsorbent is lessened by the presence of moisture in the clay and also by the presence of other impurities such as the tarry ingredients adsorbed during prior filtering steps.

In carrying out the invention, clay which has been used for filtering oil and which contains tarry coloring ingredients is heated in the presence of air to a temperature sufficiently high to burn the tarry ingredients and below a temperature which will cause fusing of the clay. The burned clay is then partially cooled to a temperature above the boiling point of water and below the vaporizing temperature of the oil which is subsequently to be treated by the clay. The oil to be treated can be lubricating oil of various distillation ranges as well as medicinal oils, or any hydrocarbon oil. The temperature to which the clay is cooled is preferably higher than the temperature at which the clay will adsorb moisture from the air.

An oil is then incorporated into the partially cooled clay. The oil used is preferably a color reduced oil such as is obtained by filteration of oil through adsorptive clay and is preferably the same as that which is to be subsequently filtered through the clay although oils of other consistencies can be used. The oil is incorporated in amounts sufficient to fill the interstices of the clay and displace the air from the clay.

The mixture of oil and clay forms a slurry of such a consistency that it can be passed through a pump. In use the slurry can be disposed in a body in a filter tank and will pack in the filter tank in a condition substantially the same as a clay which has not been thus treated with oil. The oil to be filtered is then introduced into the filter tank with or without pressure and percolates through the body of clay in contact with all of the particles of clay. This results in optimum efficiency of the body of clay with increased yields of filtered oil. The presence of the oil in the clay before the clay has fully cooled prevents access of moisture to the clay prior to its use as a filtering medium.

In carrying out the process upon clay which has not yet been used as a filtering medium, moisture is driven from the clay by heating it to a temperature above the boiling point of water. The dried clay is mixed with color reduced oil before the clay is allowed to cool sufficiently to take up moisture. It will be understood that the clay treated in the manner described can be used for the contact filtration of oils as well as for the percolation of oils through a body of clay.

Various changes may be made within the scope of the appended claims, in which it is desired to claim all novelty inherent in the invention as broadly as the prior art permits.

I claim:

1. The method of treating clay, which comprises heating the clay to a temperature above the boiling point of water to remove moisture, impregnating the dry hot clay with oil and cooling the oil impregnated clay to atmospheric temperature.

2. The method of treating adsorptive clay, which comprises heating the clay to a temperature above the boiling point of water. displacing the air in the clay while hot with color reduced oil, and cooling the mixed oil and clay to atmospheric temperature.

3. The method of treating adsorptive clay, which comprises burning impurities from the clay, cooling the burned clay to a temperature between the boiling point of lubricating oil and the boiling point of water, incorporating color reduced lubricating oil into the partially cooled clay, and cooling the mixture.

4. The method of treating adsorptive clay which comprises burning impurities from the clay, cooling the clay to a temperature above the boiling point of water, incorporating color reduced oil into the partially cooled clay, and cooling the mixture.

ROBERT B. LEBO.